United States Patent
Tolentino (10) Patent No.: US 8,572,830 B2
(45) Date of Patent: Nov. 5, 2013

(54) METHOD AND APPARATUS FOR PRODUCING MAGNETIC ATTACHMENT SYSTEM

(75) Inventor: Cesare A. Tolentino, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 13/207,941

(22) Filed: Aug. 11, 2011

(65) Prior Publication Data

US 2012/0233835 A1 Sep. 20, 2012

Related U.S. Application Data

(60) Provisional application No. 61/452,580, filed on Mar. 14, 2011.

(51) Int. Cl.
 *B23Q 1/25* (2006.01)
 *G01F 1/00* (2006.01)
(52) U.S. Cl.
 USPC .......... 29/407.09; 29/557; 148/101; 148/103; 148/121; 148/302; 269/55; 419/12; 419/33
(58) Field of Classification Search
 USPC ............ 29/407.09, 557, 602.1; 75/354; 148/101, 103, 121, 302; 269/55; 310/156.43; 419/12, 33, 37
 See application file for complete search history.

(56) References Cited

U.S. PATENT DOCUMENTS

| | | | |
|---|---|---|---|
| 3,998,669 A | 12/1976 | Strnat | |
| 4,853,045 A | 8/1989 | Rozendaal | |
| 4,952,252 A * | 8/1990 | Ghandehari | 148/105 |
| 5,041,172 A * | 8/1991 | Tokunaga et al. | 148/302 |
| 5,055,142 A * | 10/1991 | Perrier de la Bathie et al. | 148/101 |
| 5,186,761 A * | 2/1993 | Kobayashi et al. | 148/101 |
| 6,136,099 A * | 10/2000 | Akioka et al. | 148/101 |
| 6,187,259 B1 * | 2/2001 | Yamashita et al. | 419/12 |
| 6,432,158 B1 * | 8/2002 | Harada et al. | 75/245 |
| 6,605,162 B2 * | 8/2003 | Ono et al. | 148/302 |
| 7,789,933 B2 | 9/2010 | Tomizawa | |
| 8,127,431 B2 * | 3/2012 | Amano et al. | 29/598 |
| 8,388,766 B2 * | 3/2013 | Ohashi | 148/103 |
| 8,421,292 B2 * | 4/2013 | Natsumeda et al. | 310/156.43 |
| 8,500,921 B2 * | 8/2013 | Ozeki et al. | 148/101 |
| 2004/0206423 A1 * | 10/2004 | Harada et al. | 148/302 |
| 2009/0021088 A1 | 1/2009 | Groendahl | |
| 2011/0000586 A1 | 1/2011 | Nomura et al. | |

* cited by examiner

*Primary Examiner* — Alexander P Taousakis
(74) *Attorney, Agent, or Firm* — Womble Carlyle Sandridge & Rice LLP (57) ABSTRACT

A method and apparatus for producing a magnetic attachment mechanism is described. A method is provided for determining the magnetic field axis of an element prior to machining it. The magnetic field axis can be used as a reference to machine an outer surface of the magnetic element at a desired angle. The method provides a means to more precisely align magnetic field axes of corresponding magnets in a magnetic attachment system.

18 Claims, 7 Drawing Sheets

METHOD AND APPARATUS FOR PRODUCING MAGNETIC ATTACHMENT SYSTEM

This application claims priority to and the benefit under 35 U.S.C. §119(e) of U.S. Provisional Application Ser. No. 61/452,580, filed Mar. 14, 2011, entitled METHOD AND APPARATUS FOR PRODUCING MAGNETIC ATTACHMENT SYSTEM, the entire disclosure of which is hereby incorporated herein by reference.

BACKGROUND OF THE INVENTION

1. Field of the Described Embodiments

The described embodiments generally relate to magnets and methods and apparatuses for producing a magnetic attachment system. More particularly, the present embodiments describe magnets for use in releasable attachment techniques well suited for portable electronic devices.

2. Description of the Related Art

Magnets, which produce a magnetic field, are typically used to attract or repel another object. The magnetic field can produce a force that pulls on ferromagnetic materials, such as iron. The magnetic field produced by a magnet also attracts or repels other magnets.

Magnets can be used as an attachment mechanism for various objects. A common example is a refrigerator magnet that can be used to attach objects, such as paper, to a refrigerator. Magnets can also be used as an attachment means in place of mechanical fasteners in electronic devices, such as portable computing devices. Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display used for presenting visual content leaving little available space for an attachment mechanism that can be used for attaching an accessory device.

It is desirable for these portable computing devices to be as small and thin and light as possible. Conventional attachment techniques that require mechanical fasteners can add unwanted weight, bulk, and complexity to the device as well as detract from the overall look and feel of the handheld computing device, thereby degrading the appearance of the handheld computing device. Therefore, a mechanism for releasably attaching together at least two objects is desired. It is desirable for such a mechanism to be small and thin while being capable of producing enough force to attach two objects together and maintain such attachment.

SUMMARY OF THE DESCRIBED EMBODIMENTS

This paper describes various embodiments that relate to a magnet and a method for producing a magnet suitable for use in releasably attaching an accessory to an electronic device.

According to an embodiment, a method is provided for producing a magnetic element. A magnetic field axis of the element is determined by placing a sintered element formed of rare earth elements in a fixture that will allow the element to freely align with an external magnetic field applied to the element. The sintered element is then demagnetized before an outer surface of the sintered element is machined in the fixture at a desired angle to the magnetic field axis.

In accordance with another embodiment, a fixture is provided for supporting a magnetic element and for determining a magnetic field axis of the magnetic element. The fixture is configured to support a sintered element while allowing the sintered element to freely align with an external magnetic field applied to the sintered element. The fixture is further configured to fix the sintered element in a locked position in the fixture after the sintered element freely aligns with the external magnetic field and to support the sintered element in the locked position while the sintered element is machined. In one configuration, the fixture includes first and second annular elements and a base. The first annular element is configured to surround the sintered element and to provide a first axis of rotation for the sintered element, and the second annular element is configured to surround the first annular element and to provide a second axis of rotation for the sintered element. The first and second annular elements each have a locking feature for preventing rotation about its respective axis. The base can support the sintered element and the first and second annular elements.

In accordance with yet another embodiment, a method is provided for making a magnetic attachment system. A sintered and demagnetized block comprising rare earth elements is received in a fixture. The fixture allows the block to freely align with an external magnetic field applied to the element. The external magnetic field can then be applied to the block. The block is then locked in place after the block has freely aligned with the applied external magnetic field. After being locked in place, the block can be demagnetized. After demagnetizing, the outer surface of the block can be machined in the fixture at a desired angle to the magnetic field axis.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism, such as a magnetic attachment system, that can be used to releasably attach together at least two suitably configured objects and a method of making such a mechanism. Each of the objects can include an attachment feature arranged to provide a magnetic field having appropriate properties. When the attachment features are brought into proximity with each other, the magnetic fields can cooperatively interact based upon their respective properties, resulting in the objects magnetically attaching to each other in a desired and repeatable manner. For example, the objects can attach to each other in a pre-determined position and relative orientation without external intervention. The objects can self-align and self-center to attach in a desired orientation.

These and other embodiments are discussed below with reference to FIGS. 1-7. However, those skilled in the art will readily appreciate that the detailed description given herein with respect to these figures is for explanatory purposes only and should not be construed as limiting.

Typically, a manufacturing process for producing magnets begins with melting Rare Earth elements, such as, for example, neodymium, iron, and boron, to form an alloy. The melted neodymium iron boron (NdFeB) alloy then is then cooled, forming ingots of the alloy. The alloy ingots are then pulverized into small magnetic particles that are about several microns in size. The magnetic particles are then placed in a jig to press them into shape while a magnetic field is applied. While the magnetic field is applied, the magnetic domains of the particles align with the magnetic field that is applied. The magnetic field can be applied using electromagnetic coils that are typically positioned normal to the surface of the pressing block. Thus, the resulting orientation of the magnetic field axis is generally normal to the surface of the pressed magnet. However, there can be a need to have a magnetic field axis that is at an angle or not normal to the surface of the magnet. There have been attempts to orient the magnetic field axis at an angle to the pressing block, but such attempts have been unsuccessful thus far, usually resulting in a fractured block.

Before the pressed magnet is released from the jig, a demagnetizing pulse is applied to demagnetize the magnet. The pressed particles are then heat treated in a sintering furnace to give the magnet its magnetic properties and to increase its density. The sintering process causes the pressed magnet to no longer have a flat or smooth outer surface and to shrink as the particles fuse together. The shrinking that occurs during the sintering process results in an uneven outer surface that can be unpredictable and often the shape of the magnet will not be to desired dimensions. Because the outer surface is unpredictable, it is also difficult to predict variations of the outer surface of the block relative to the magnetic field axis.

In order to achieve the required measurements of the magnets, the outer surface is then machined so that the surface is flat and to the desired dimensions. It should be noted that, in this conventional process, the machining does not reference the magnetic field axis. Instead, the outer surface of the sintered magnet is referenced. The machining includes grinding the sintered magnet using cutting tools or abrasives. Diamond cutting tools or abrasives can be used for the grinding because the magnet is very hard. Because magnetic material is ground during the machining process, the magnets are made larger during the pressing process so that some of the material can be machined away to achieve the desired dimensions. Alternatively, the magnet can be sliced to achieve the desired dimensions and a flat outer surface. A large block can be further sliced into many blocks of the desired size. The first cut is typically used as a reference for the rest of the machining of the block. Unfortunately, both the machining and slicing processes can result in a large amount of wasted magnetic material that is cut or ground away.

According to an embodiment, the magnetic field axis can be used as a reference for machining the block rather than the outer surface of the block, as in the process described above. In order to use the magnetic field axis as a reference, one must be able to measure the axis, which can be difficult if the block is not magnetized. One of ordinary skill in the art will recognize that there are various known ways to measure the magnetic field axis. For example, one method of measuring the magnetic field axis is to at least partially magnetize the block in order to measure the magnetic field axis, whereas another method of measuring the magnetic field axis is to measure the axis when it is not magnetized.

Figure 1:
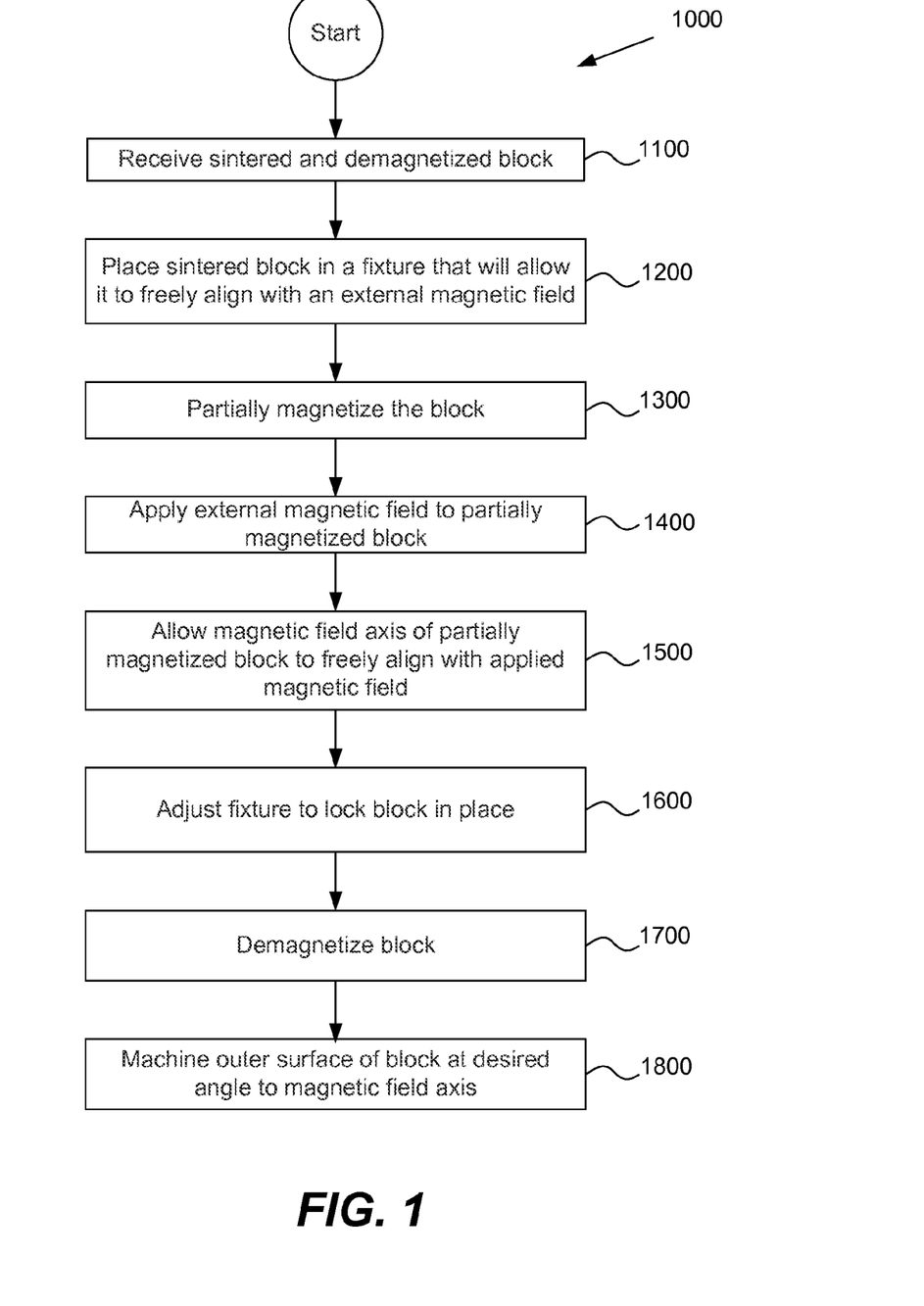
FIG. 1 is a flowchart detailing a process of producing a magnetic element in accordance with the described embodiments.

FIG. 1 is a flowchart detailing a process 1000 of producing a magnetic element in accordance with an embodiment. The magnetic field axis of the magnetic block produced in accordance with this process 1000 can be at an angle to the outer surface of the block, rather than normal to the surface. According to this embodiment, the process 1000 includes receiving a demagnetized and sintered block in step 1100.

As noted above, the sintering process can result in a sintered magnet that has an uneven outer surface that can be unpredictable and often the shape of the magnet will not be to desired dimensions due to shrinkage. Because the outer surface of the sintered block is unpredictable, it is also difficult to predict variations of the outer surface of the block relative to the magnetic field axis. Process 1000 provides a method of measuring the magnetic field axis so that the outer surface of the sintered block can be machined flat at a desired angle to the magnetic field axis. In order to measure the magnetic field axis, process 1000 continues with step 1200 in which the block is placed in a fixture that will allow the block to freely align with an external magnetic field. In step 1300, the block is at least partially magnetized and in step 1400 an external magnetic field is applied to the block. Partial magnetization of the block, as opposed to full magnetization, allows the block to react to a magnetic input while reducing potential damage to the block and to operators of the machinery. An electromagnet can be used to induce the external magnetic field. In step 1500, the partially magnetized block is allowed to freely align with the applied magnetic field. A fixture, as described below and with reference to FIG. 3, can allow the block to freely align with the applied magnetic field.

For example, the block can be suspended in a container filled with a liquid and an external magnetic field can be induced, causing the block to freely align with the magnetic field. The liquid can then be frozen to lock the aligned block in place for a subsequent machining step. An alternative fixture 200 that will allow the block to freely align with the applied magnetic field will be described in more detail below, with reference to FIG. 3.

After the block self-aligns with the magnetic field, in step 1600, the fixture can be adjusted to lock the magnetic block in place so that the outer surface of the block can be machined at a desired angle to the magnetic field axis in step 1800. Prior to machining, the block can be demagnetized in step 1700. The block can then be magnetized again for use in a magnetic attachment system.

Figure 2:
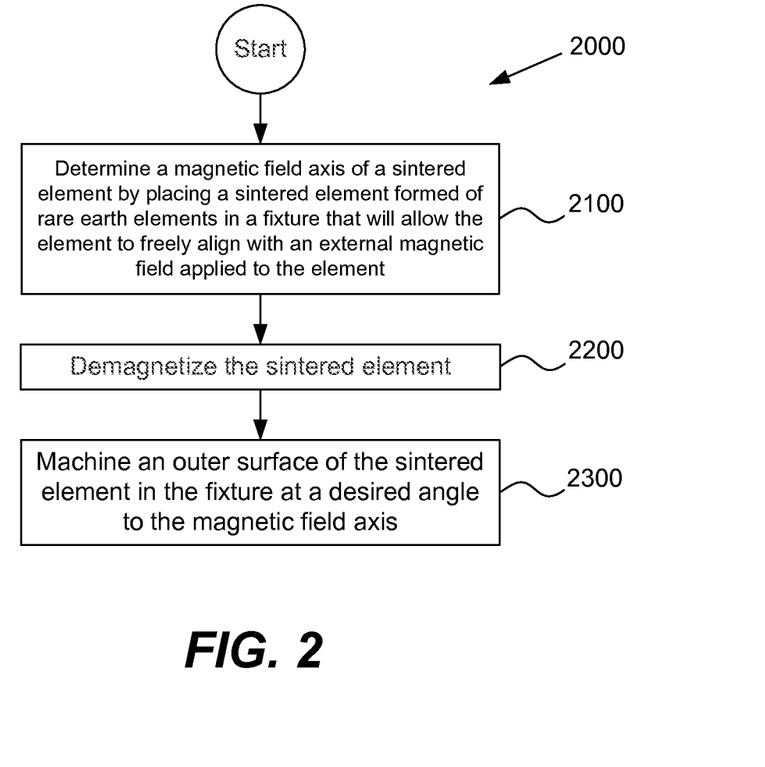
FIG. 2 is a flowchart of a process of producing a magnetic element in accordance with an embodiment.

FIG. 2 is a flowchart of a process 2000 in accordance with an embodiment. The process 2000 begins at step 2100 with determining a magnetic field axis of a sintered element by placing a sintered element formed of rare earth elements in a fixture that will allow the element to freely align with an external magnetic field applied to the element. In step 2200, the sintered element is demagnetized before machining an outer surface of the sintered element in the fixture at a desired angle to the magnetic field axis in step 2300.

Figure 3:
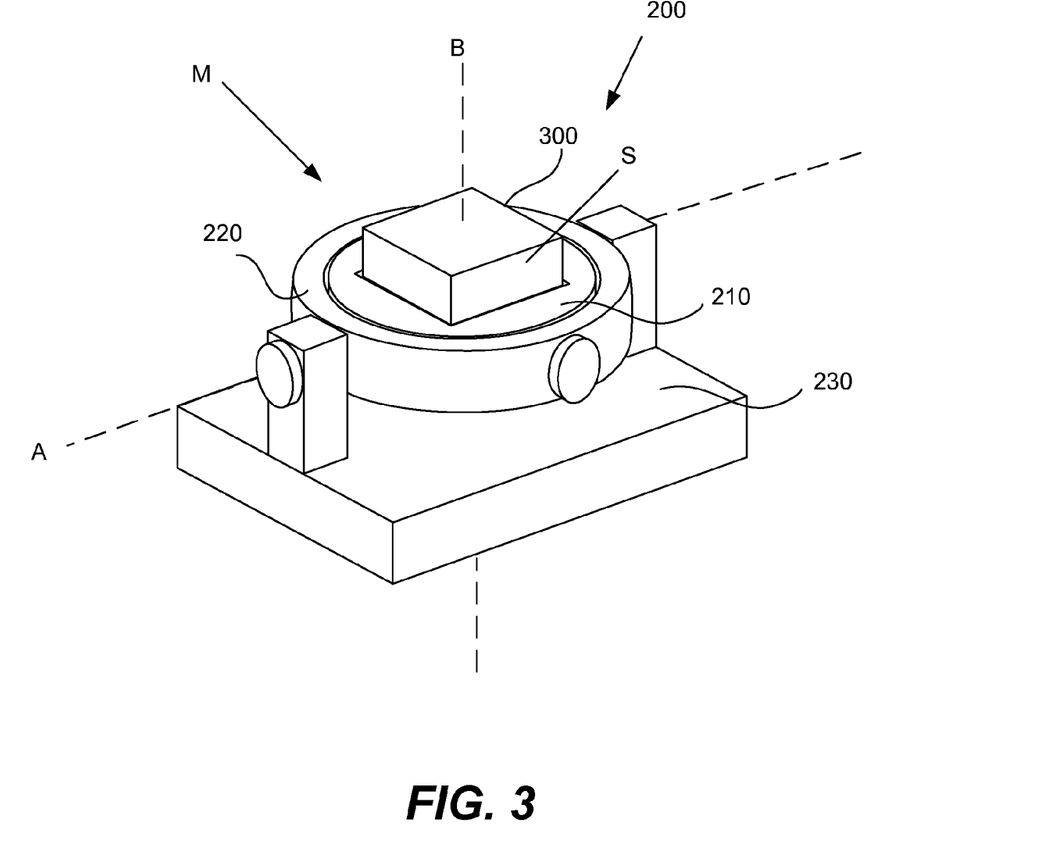
FIG. 3 shows a perspective view of a fixture that can be used to determine the magnetic field axis and also constrain a magnetic block while an outer surface of the block is machined at a desired angle to the magnetic field axis.
Figure 4:
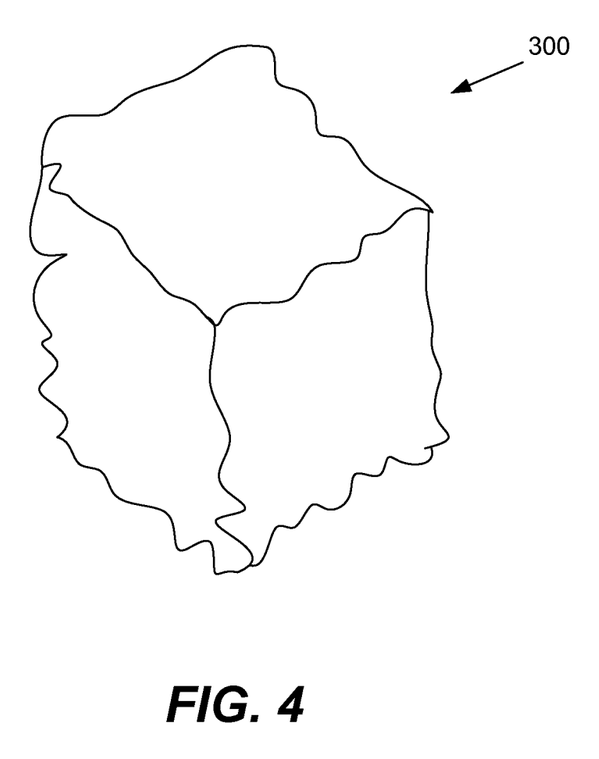
FIG. 4 shows a perspective view of a sintered magnetic block.

According to an embodiment, a fixture 200, such as the one illustrated in FIG. 3, can be used to support the sintered block 300 while allowing the block 300 two degrees of freedom. In other words, the fixture 200 allows the block 300 to pivot about two axes A, B that are substantially perpendicular to the magnetic field M, thereby allowing the block 300 to freely align with an external magnetic field M that is applied to the block 300. The direction of magnetic field M is illustrated by arrow M in FIG. 3. It should be noted that sintered block 300 is illustrated with a flat outer surface for simplicity. However, as discussed above, the sintered block 300 has an uneven outer surface, as shown in FIG. 4, prior to being machined.

As shown in FIG. 3, the fixture 200 can include a magnet nest 210, an annular ring 220, and a fixture base 230. The magnet nest 210 can provide a first axis of rotation with an axis locking feature. An annular ring 220 around the magnet nest 210 can provide a second axis of rotation with a locking feature. The fixture base 230 can support the block 300 and can also be used to align the fixture 200 to the applied magnetic field M as well as the machining equipment.

The external magnetic field M causes the block 300 to pivot about the two axes A, B such that the block 300 freely aligns with the induced magnetic field M. Once aligned, the magnet nest 210 and annular ring 210 can lock the block 300 in place so that it remains aligned with the magnetic field M during the machining process. It should be noted that the sintered block 300 can be demagnetized prior to the machining process.

As noted above, the fixture base 230 can be used to align the fixture 200 with the constrained block 300 with the machining equipment. An outer surface, such as surface S, of the block 300 can then be machined flat at the desired angle to the magnetic field axis. This machined surface can then be used as the reference surface for subsequent machining of the block 300.

Magnets produced by the process 1000 described above can be used for various purposes, including securably and releasably attaching objects together. For example, such magnets can be used in electronic devices, such as a portable computing device. One example of such a device is a tablet computing device such as the iPad™ manufactured by Apple Inc. of Cupertino, Calif. A magnetic attachment system can be used to attach a cover assembly with the tablet device.

Figure 5:
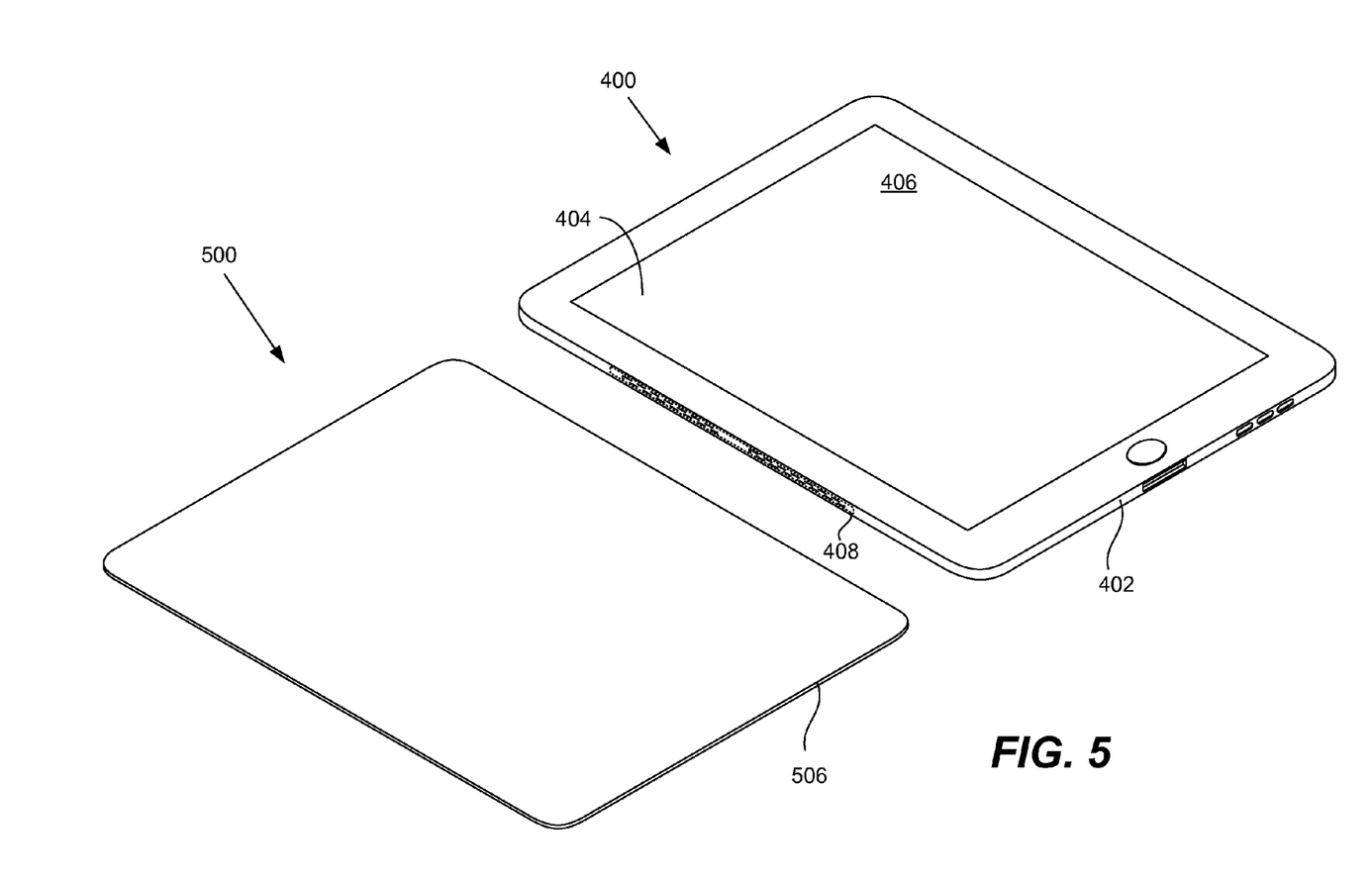
FIG. 5 shows a first perspective view of an electronic device in the form of a tablet device and the accessory device in the form of a protective cover.
Figure 6:
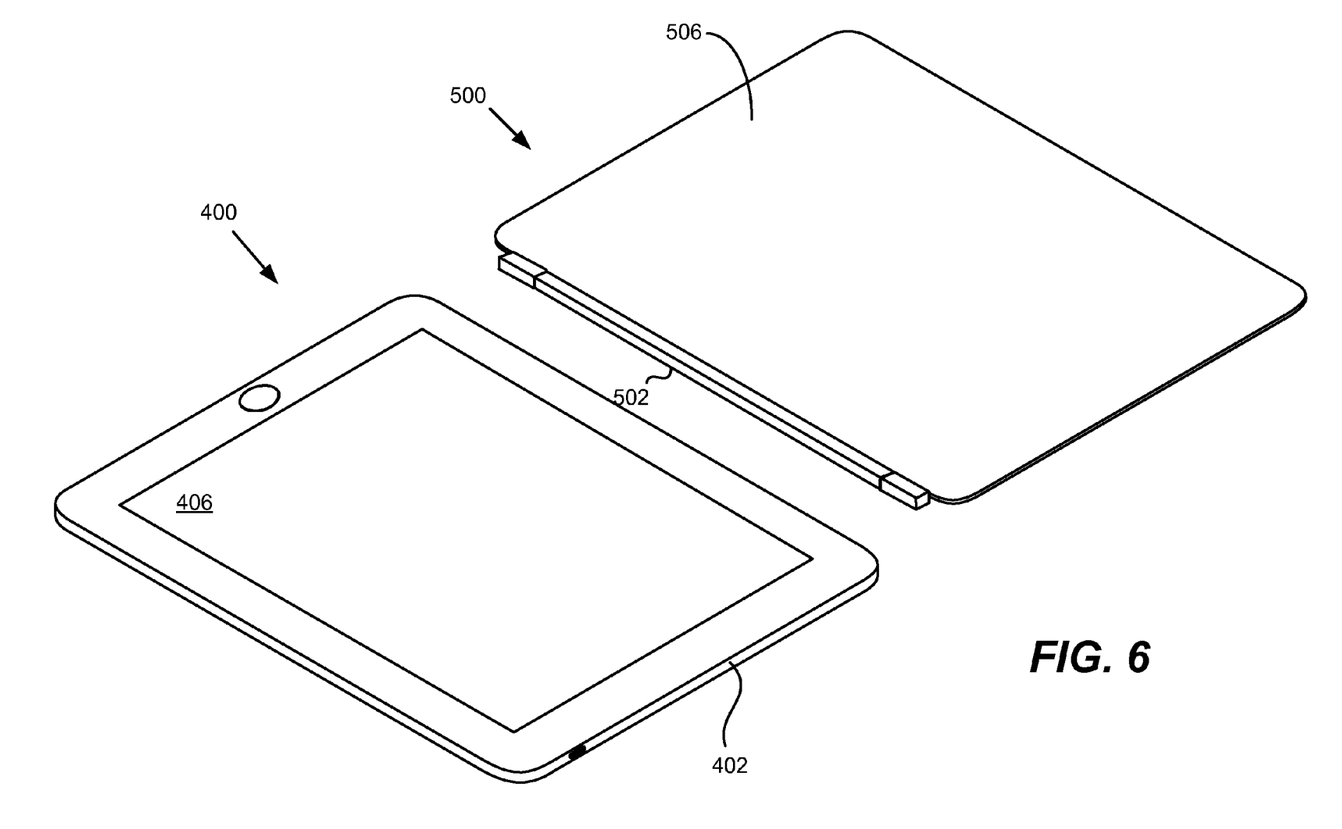
FIG. 6 shows a second perspective view of the electronic device in the form of a tablet device and the accessory device in the form of a protective cover.

FIGS. 5 and 6 show a tablet device 400 and a cover assembly 500, each in perspective top views. In particular, FIGS. 5 and 6 show two perspective views of tablet device 400 and cover assembly 500 in the open configuration. For example, FIG. 5 shows device attachment feature 408 included in tablet device 400. FIG. 6 is the view presented in FIG. 5 rotated about 180° to provide a second view of attachment feature 502 and its relationship with cover assembly 500.

Referring now to FIG. 5, tablet device 400 can include housing 402 that can enclose and support device attachment feature 408. In order to not interfere with the magnetic field generated by device attachment feature 408, at least that portion of housing 402 nearest device attachment feature 408 can be formed of a non-magnetic material. Housing 402 can include opening 404 for placing internal components and can be sized to accommodate a display assembly or system suitable for providing a user with at least visual content as for example via a display.

Cover assembly 500 can include flap 506. In one embodiment, flap 506 can have a size and shape in accordance with cover glass 406. Flap 506 can be pivotally connected to accessory attachment feature 502 by way of a hinge assembly (not shown). The magnetic attachment force between attachment feature 502 and device attachment feature 408 can maintain cover assembly 500 and tablet device 400 in a proper orientation and placement vis-à-vis flap 506 and cover glass 406.

The magnetic attachment system for securably and releasably attaching the tablet device 400 and cover assembly 500 can be embodied as embedded magnetically attractable elements in the form of the magnetic attachment feature 408 within the sidewalls or housing 402 of tablet device 400 and magnetic attachment feature 502 within the cover assembly 500. The magnetic device attachment feature 408 can provide a magnetic field that can cooperate with corresponding accessory attachment feature 502 when placed in proximity to one another. The magnetic field can establish a net magnetic attractive force that can pull the attachment features 408, 502 together into mating engagement at an engagement surface where the respective magnetic field axes are substantially aligned.

Magnets produced by process 1000 can provide better alignment between corresponding magnets, especially where the magnets do not have a flat outer surface, thereby providing more precise alignment of parts as well as a more secure attachment of the parts. For example, the outer surfaces of the corresponding magnets can be curved. Moreover, the process 1000 allows for a more efficient magnet geometry that may allow smaller magnets to be used, thereby producing cost savings as well as environmental benefits by reducing the amount rare earth elements needed to produce the magnets.

The more accurately aligned the magnetic field axes of the respective magnetic attachment features 408, 502, the better and more precisely the tablet device 400 and cover assembly 500 will mate because the net magnetic attractive force will be stronger. It will be understood that if the magnetic field axes of the respective magnets are substantially aligned, then the net magnetic attractive force will be stronger.

The net magnetic attachment can be facilitated by the surfaces of the tablet device 400 and cover assembly 500 conforming well matched fit to each other. For example, one surface can be flat or have a concave geometry whereas the other surface can have a matching conforming convex geometry. In this way, by fitting tightly together, a separation distance between each of the corresponding magnetic elements can be reduced to a minimum. Furthermore, the embedded magnets can also be shaped to conform to the shape of the housing 402 in which it is embedded. Magnets in the cover assembly 500 can also be shaped to match the geometry of the magnets in the tablet device 400. As discussed above, a stronger net magnetic force can be achieved with magnetic field axes that are substantially aligned. It will be understood that additional magnetic elements, although not illustrated, can be provided in the cover assembly 500 and tablet device 400 to magnetically attach together other parts, such as the flap 506 and cover glass 406.

Figure 7:
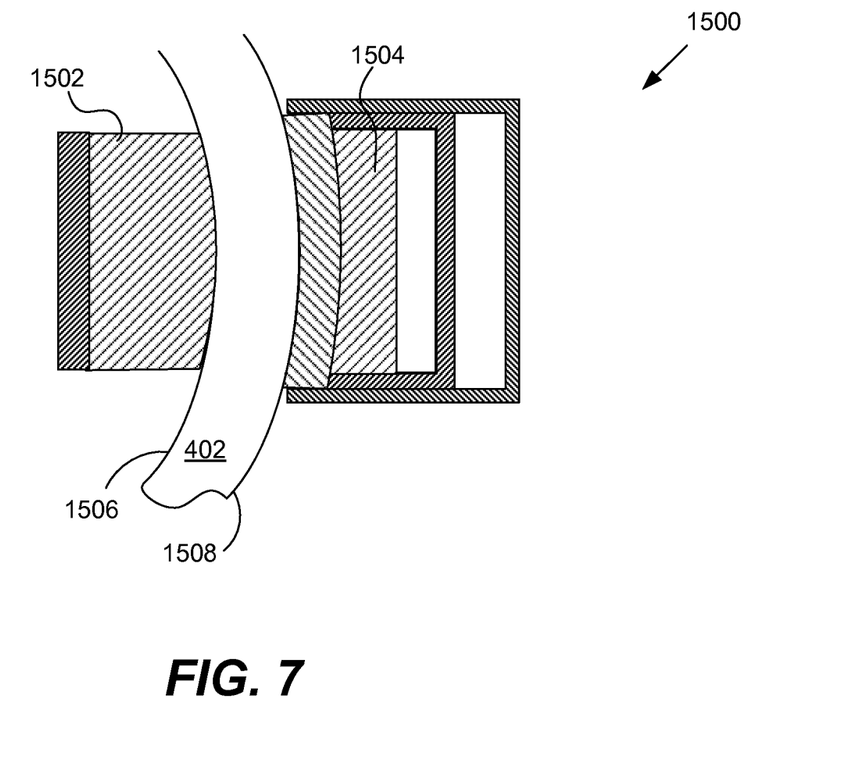
FIG. 7 shows a cross sectional side view of one embodiment of the hinge portion of a cover assembly magnetically attached to a housing having a curved surface.

FIG. 7 shows a cross sectional side view 1500 of a hinge portion of magnetic attachment feature 502 of a cover assembly 500 with an embedded magnetic magnetically attached to housing 402 having a curved shape. Magnetic element 1502 can be incorporated into device attachment feature 408 in tablet device 400. Magnetic element 1502 can magnetically interact with corresponding magnetic element 1504 of magnetic attachment feature 502. In order to minimize the separation distance between the magnetic elements (and thereby increase net attractive magnetic force), magnetic element 1502 can be shaped to conform to the interior surface 1506 of housing 402. Similarly, magnetic element 1504 can also be shaped to conform to exterior surface 1508 of housing 402. In this way, the distance between magnetic element 1502 and magnetic element 1504 can be reduced, thereby increasing the net attractive magnetic force between the two magnetic elements 1502, 1504.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of producing a magnetic element, the method comprising:
    determining a magnetic field axis of the element by placing a sintered element formed of rare earth elements in a fixture that will allow the element to freely align with an external magnetic field applied to the element;
    demagnetizing the sintered element; and
    machining an outer surface of the sintered element in the fixture at a desired angle to the magnetic field axis, further comprising locking the sintered element in place in the fixture after determining the magnetic field axis and before machining the outer surface.

2. The method of claim 1, wherein placing the sintered element comprises forming an alloy including neodymium, iron, and boron.

3. The method of claim 1, wherein the sintered element is allowed at least two degrees of freedom in the fixture.

4. The method of claim 1, wherein the fixture allows the sintered element to pivot about two axes that are substantially perpendicular to the magnetic field axis.

5. The method of claim 1, further comprising adjusting the fixture to prevent the sintered element from pivoting about the axes.

6. The method of claim 1, further comprising demagnetizing compacted particles before sintering to form the sintered element.

7. The method of claim 1, further comprising:
    creating particles formed from an alloy of the rare earth elements;
    compacting the particles while applying a magnetic field; and
    sintering the compacted particles to form the sintered element.

8. The method of claim 1, further comprising magnetizing the element after machining.

9. A method of making a magnetic attachment system, comprising:
    receiving in a fixture a sintered and demagnetized block comprising rare earth elements, wherein the fixture allows the block to freely align with an external magnetic field applied to the element;
    applying an external magnetic field to the block;
    locking the block in place after the block has freely aligned with the applied external magnetic field;
    demagnetizing the block after locking it in place; and
    machining an outer surface of the block in the fixture at a desired angle to the magnetic field axis after demagnetizing.

10. The method of claim 9, further comprising partially magnetizing the block before applying the external magnetic field.

11. The method of claim 9, wherein machining comprises shaping the outer surface of the block to conform to a surface of a housing in which the block is to be placed.

12. The method of claim 9, wherein the machining comprises shaping the outer surface of the block to be curved.

13. The method of claim 9, wherein machining comprises shaping the outer surface of the block to conform to an outer surface of another magnetic block with which the block attracts in the magnetic attachment system.

14. The method of claim 1 further comprising:
    supporting the sintered element while allowing the sintered element to align with the external magnetic field;
    fixing the sintered element in a locked position after the sintered element is aligned with the external magnetic field; and
    locking the sintered element while machining an outer surface of the sintered element.

15. The method of claim 14 further comprising:
    surrounding the sintered element with a first annular element, providing a first axis of rotation for the sintered element;
    surrounding the first annular element with a second annular element, providing a second axis of rotation for the sintered element; and
    supporting the sintered element and the first and second annular elements as the sintered element is aligned with the external magnetic field.

16. The method of claim 15 further comprising selecting the first axis of rotation to be substantially perpendicular to the second axis of rotation.

17. The method of claim 16 further comprising selecting the first axis of rotation and the second axis of rotation to be perpendicular to a magnetic field axis of the external magnetic field.

18. The method of claim 14 further comprising:
    suspending the sintered element in a liquid; and
    freezing the liquid to fix and support the sintered element in the locked position.

* * * * *